United States Patent
Mahalingam et al.

(10) Patent No.: US 8,332,678 B1
(45) Date of Patent: Dec. 11, 2012

(54) POWER SAVE MODE OPERATION FOR CONTINUOUS DATA PROTECTION

(75) Inventors: Anandh Mahalingam, Fremont, CA (US); Raja Jayaraman, Fremont, CA (US); Abhishek Khare, Chennai (IN); Rajesh Arivoli, Salem (IN)

(73) Assignee: American Megatrends, Inc., Norcross, GA (US)

( * ) Notice: Subject to any disclaimer, the term of this patent is extended or adjusted under 35 U.S.C. 154(b) by 184 days.

(21) Appl. No.: 12/791,952

(22) Filed: Jun. 2, 2010

Related U.S. Application Data

(60) Provisional application No. 61/183,409, filed on Jun. 2, 2009.

(51) Int. Cl.
*G06F 11/30* (2006.01)

(52) U.S. Cl. .......................................... 713/340; 713/300

(58) Field of Classification Search ........... 713/300–340
See application file for complete search history.

(56) References Cited

U.S. PATENT DOCUMENTS

| | | | | |
|---|---|---|---|---|
| 5,717,934 A * | 2/1998 | Pitt et al. | | 713/330 |
| 5,793,124 A * | 8/1998 | Mitzaki | | 307/66 |
| 6,079,026 A * | 6/2000 | Berglund et al. | | 713/340 |
| 7,036,035 B2 * | 4/2006 | Allison et al. | | 713/340 |
| 7,187,858 B2 * | 3/2007 | Dowe et al. | | 396/277 |
| 7,360,107 B2 * | 4/2008 | Yuasa | | 713/340 |
| 7,373,366 B1 | 5/2008 | Chatterjee et al. | | |
| 7,406,488 B2 | 7/2008 | Stager et al. | | |
| 7,472,300 B1 * | 12/2008 | Haustein et al. | | 713/323 |
| 7,505,795 B1 * | 3/2009 | Lim et al. | | 455/574 |
| 7,525,218 B2 * | 4/2009 | Togashi | | 307/65 |
| 7,844,643 B2 | 11/2010 | Judd | | |
| 2006/0069931 A1 * | 3/2006 | Shin et al. | | 713/300 |
| 2006/0244197 A1 * | 11/2006 | Yee et al. | | 271/145 |
| 2007/0143366 A1 | 6/2007 | D'Souza et al. | | |
| 2007/0220309 A1 | 9/2007 | Andre et al. | | |
| 2007/0233756 A1 | 10/2007 | D'Souza et al. | | |
| 2007/0276878 A1 | 11/2007 | Zheng et al. | | |
| 2008/0208927 A1 | 8/2008 | Chikusa et al. | | |
| 2009/0182784 A1 | 7/2009 | Rohit et al. | | |
| 2009/0182959 A1 | 7/2009 | Rao | | |
| 2009/0275355 A1 * | 11/2009 | Tan et al. | | 455/522 |
| 2009/0276643 A1 * | 11/2009 | Saito | | 713/300 |
| 2009/0327357 A1 | 12/2009 | Beglin et al. | | |
| 2010/0064150 A1 * | 3/2010 | Higuchi | | 713/300 |
| 2011/0251898 A1 * | 10/2011 | Scott et al. | | 705/14.62 |

OTHER PUBLICATIONS

U.S. Official Action, dated Dec. 23, 2011, received in connection with related U.S. Appl. No. 12/472,858.

* cited by examiner

*Primary Examiner* — Raymond Phan
(74) *Attorney, Agent, or Firm* — Meunier Carlin & Curfman, LLC

(57) ABSTRACT

Technologies are described herein for providing a power-save mode of operation for a continuous data protection ("CDP") process. A CDP module executing on a computer detects when the computer is operating under battery power, and enters a power-save mode of operation. In the power-save mode, the CDP module monitors the state of the battery and restricts the CDP process based on a set of configuration settings specified for one of a number of zones, where each zone defines an upper and lower thresholds for a level of charge of the battery. If external power is restored to the computer, the CDP module restores the normal mode of operation for the CDP process.

18 Claims, 4 Drawing Sheets

POWER SAVE MODE OPERATION FOR CONTINUOUS DATA PROTECTION

CROSS-REFERENCE TO RELATED APPLICATION

This application claims the benefit of U.S. provisional patent application No. 61/183,409, filed on Jun. 2, 2009, entitled "A Novel Method of Power Save Mode Operation for Continuous Data Protection in a Storage System," which is expressly incorporated herein by reference in its entirety.

BACKGROUND

Continuous data protection ("CDP"), also called continuous backup, generally refers to the backup of data on a computer by automatically saving a copy of every change made to that data. While traditional backup solutions take a snapshot of the files or data on a computer at a specific time, CDP essentially captures every new version of the data saved on the computer in real-time. CDP may be performed at the file-level or at the device-level. Device-level CDP generally allows a user or administrator to roll back the entire state of the device, such as a disk drive, to any point in time, while file-level CDP may allow a user to view and select a specific version of a particular data file to restore.

File-level CDP is typically implemented through a background service executing on a computer that monitors specified files and folders stored on local or remote storage volumes. When a monitored data file is changed, the new, modified version of the file is copied to one or more backup locations, such as internal storage, an external/removable storage device, a remote storage system, and/or a storage service in the "cloud." In order to reduce the storage space required on the backup locations, the CDP process may perform compression of the new version of the file. Because multiple versions of the same file may have a large amount of common data, the CDP process may further perform de-duplication of the new version of the file against a previously stored version to remove the duplicate data. In addition, if the backed-up file is to be copied to a backup location accessible to multiple users, such as an external/removable storage device or cloud-based storage, the CDP process may encrypt the new version of the file before copying it to the backup location.

The compression, de-duplication, and encryption of the new version of the backed-up file all require extra processing cycles and memory usage, invariably leading to additional power usage on the computer. While this may be acceptable on desktop computers and workstations which are attached to an external power source, for laptops and notebook computers which often run on battery power, the additional power usage may unacceptably limit the working time for the computer when not attached to external power. It is desirable to maintain some level of CDP on these mobile devices, however, to guard against virus infections, hardware failures, lost or stolen media, system shutdown due to exhausted battery, and the like.

It is with respect to these considerations and others that the disclosure made herein is presented.

SUMMARY

Technologies are described herein for providing a power-save mode of operation for a continuous data protection ("CDP") process. Through the utilization of the technologies and concepts presented herein, a CDP module executing on a computer detects when the computer is operating under battery power, and enters a power-save mode of operation. In the power-save mode, the CDP module monitors the state of the battery and implements restrictions on the CDP process in order to reduce the power utilization required by the CDP module. In this way, the run-time of the computer while operating under battery power may be prolonged, without completely eliminating the CDP process executing on the computer.

According to embodiments, a set of configuration settings is specified for each of a number of zones, where each zone defines an upper and lower threshold for a level of charge of the battery. As the battery level falls within the threshold level defined for a particular zone, the CDP module configures the CDP process based on the set of configuration settings corresponding to that zone. In one embodiment, the set of configuration settings for each zone defining a lower threshold level of charge is equally or more restrictive than the zones defining higher threshold levels. If external power is restored to the computer, the CDP module restores the normal mode of operation for the CDP process.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a power-save mode of operation for a continuous data protection process. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
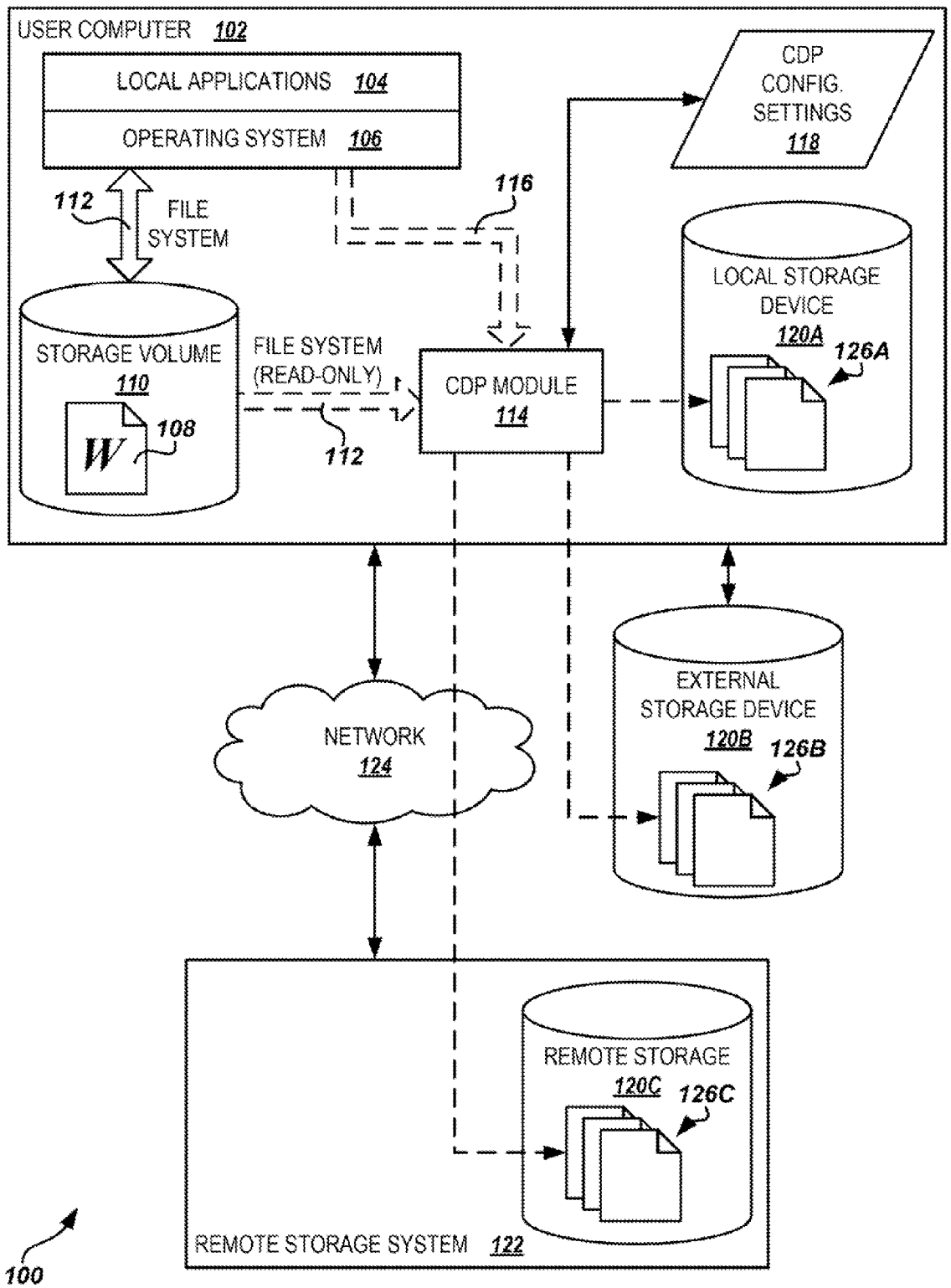
FIG. 1 is a block diagram showing aspects of an illustrative operating environment, including several software components provided by the embodiments presented herein.

FIG. 1 shows aspects of an illustrative operating environment 100 for the embodiments described herein, including a user computer 102. The user computer 102 may be a laptop computer, a notebook, a mobile phone, a personal digital assistant ("PDA"), a desktop workstation or PC attached to an uninterruptable power supply ("UPS"), or any other computing device that may operate on a battery or other temporary power source. The user computer 102 executes local applications 104 and an operating system ("OS") 106 that read and write data files, such as the data file 108, stored on a storage volume 110.

The storage volume 110 may be located on a local storage device, such as a local hard drive, or the storage volume may be hosted on a remote storage system, such as a SAN volume or NAS volume accessed across a network 124 utilizing an appropriate protocol. The local applications 104 and the OS 106 may read and write data files 108 to the storage volume 110 utilizing a locally implemented file system 112, such as NTFS. It will be appreciated that the local applications 104 and the operating system 106 may utilize other file system 112 protocols to access the storage volume 110, including, but not limited to, the network file system ("NFS") protocol, the server message block ("SMB") protocol, and the like.

The user computer 102 also includes a continuous data protection ("CDP") module 114. The CDP module 114 executes on the user computer 102 and monitors specified files and folders on the storage volume 110 for changes in real-time. In one embodiment, the CDP module 114 utilizes "hooks" 116 provided by the OS 106 or the file system 112 of the user computer 102 to be notified of changes in the specified data files 108. In another embodiment, the CDP module 114 monitors the storage volume 110 directly through the file system 112 to detect changes to the specified data files 108. The CDP module 114 may provide facilities that allow users or administrators of the user computer 102 to specify which data files 108 on the storage volume 110 to monitor. The users or administrators may specify folder names, file names, file types, or any other specification of files to monitor. The specification of the files to monitor may be stored in CDP configuration settings 118 maintained on the user computer 102, for example.

When a monitored data file 108 is changed on the storage volume 110, the CDP module 114 initiates the CDP process to store the modified version of the file to one or more backup locations 120A-120C (referred to herein generally as backup location 120). The backup location(s) 120 may include a local storage device 120A, such as a local hard drive or tape drive. Additionally or alternatively, the backup location(s) 120 may include an external/removable storage device 120B connected to the computer through a detachable interface, such as an external serial advanced technology attachment ("eSATA") interface, a serial attached small computer system interface ("SCSI"), a universal serial port ("USB") interface, a FIREWIRE® serial bus from Apple, Inc. of Cupertino, Calif., and the like. The backup location(s) 120 may further include remote storage 120C, such as a SAN volume or NAS volume hosted on a remote storage system 122 accessed across the network, or a cloud-based storage service accessed across the Internet. The one or more backup location(s) 120 on which to store the modified versions of the monitored data files 108 may be specified by the users or administrators of the user computer 102 and stored in the CDP configuration settings 118.

The CDP module 114 may maintain a collection of files 126A-126C (referred to herein generally as collection of files 126) on the backup location(s) 120 for each of the monitored data files 108. The collection of files 126 may include an individual file for each backed-up version of the data file 108, or the collection of files 126 may comprise a storage mechanism for efficiently storing multiple versions of the backed-up data file along with metadata for each version. According to embodiments, the CDP process initiated by the CDP module 114 may include compressing the modified version of the data file 108 and/or performing de-duplication of the modified version of the file against a previously stored version to reduce the storage requirements of the collection of files 126 on the backup location(s) 102.

In addition, if the data file 108 is to be backed-up to a backup location 120 accessible to multiple users, such as the external/removable storage device 120B or the remote storage 120C, the CDP process may further include encrypting the new version of the file before storing it to the backup location. The CDP module 114 may further provide facilities that allow the users or administrators of the user computer 102 to specify a maximum number of versions of each data file that are to be maintained on the backup location(s) 120; the compression, de-duplication, and/or encryption processes to be employed in the CDP process; and the like. These settings may further be stored in the CDP configuration settings 118 described above.

According to embodiments, the CDP module 114 may change the operation of the CDP process depending on whether the user computer 102 is operating in a normal mode, i.e. receiving power from an external power source, or whether the computer is receiving power from a battery or UPS. When the user computer 102 is receiving power from a battery or UPS, the CDP module 114 may implement a power-save mode of operation for the CDP process, as will be described in more detail below in regard to FIGS. 2 and 3. The power-save mode may restrict or eliminate specific operations from the CDP process, such as compression, de-duplication, and/or encryption, in order to reduce the extra processing cycles and memory usage required by these operations, thus reducing the power usage of the CDP process on the user computer 102 and extending the run-time of the computer while operating on battery power.

Figure 2:
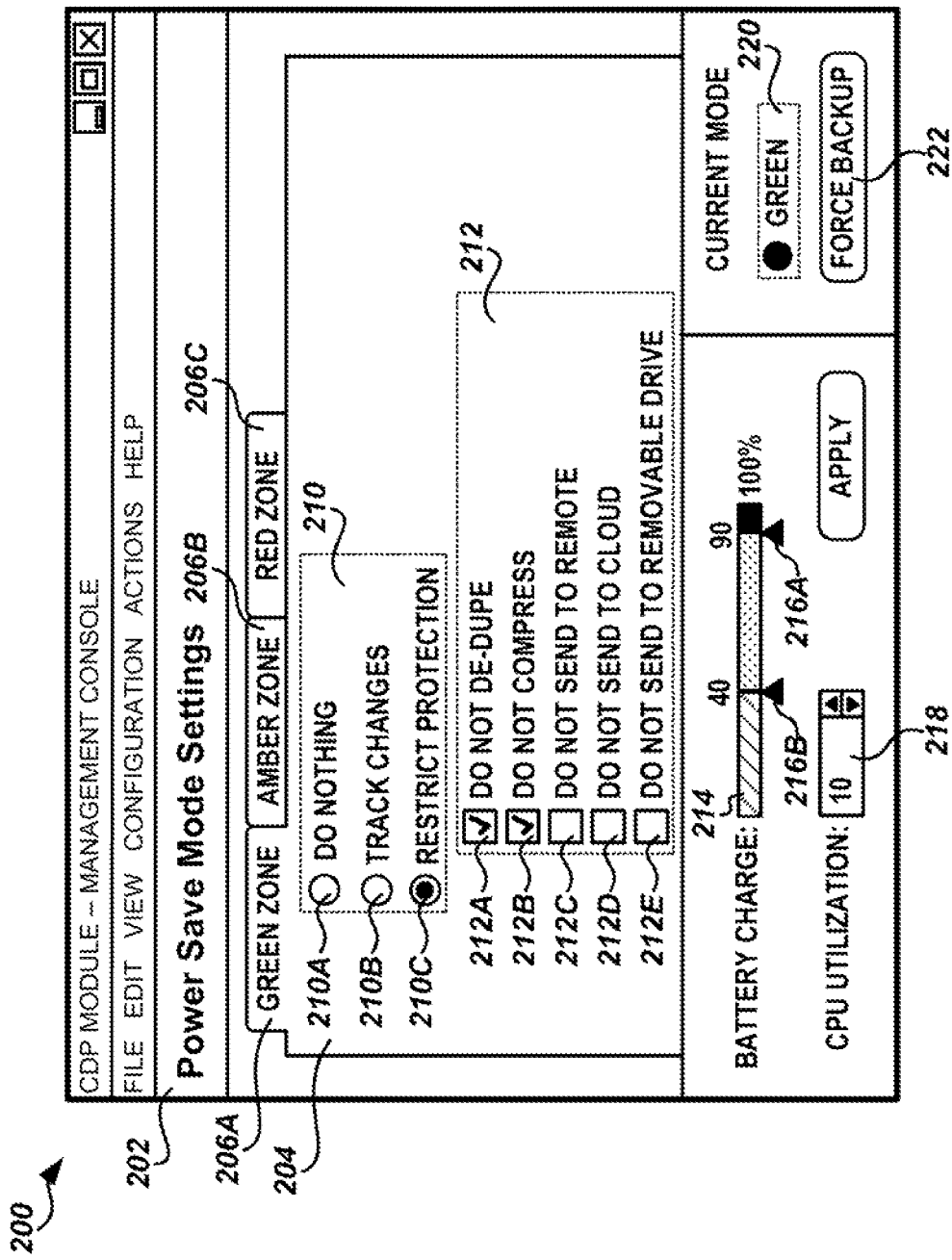
FIG. 2 is a display diagram showing an exemplary user interface for configuring a power-save mode of operation of a continuous data protection process, according to embodiments presented herein.

FIG. 2 shows an exemplary user interface 200 for allowing the users or administrators of the user computer 102 to configure the various CDP configuration settings 118 utilized by the CDP module 114 while operating in the power-save mode, according to one embodiment. The CDP module 114 may display the user interface 200 to the users or administrators on a display device attached to the computer. The users or administrators may adjust the various CDP configuration settings 118 by interacting with user interface ("UI") controls included in the user interface 200 utilizing an input device, such as a mouse, keyboard, touch screen, electronic stylus, and the like.

The user interface 200 includes a window 202 in which the CDP configuration settings 118 regarding the power-save mode of operation for the CDP module 114 are shown. According to one embodiment, different sets of CDP configuration settings 118 may be utilized by the CDP module 114 during the execution of the CDP process, depending on the state of the battery supplying power to the user computer 102. For example, as shown in FIG. 2, the user interface 200 provides a panel 204 containing the UI controls for viewing and setting the configuration settings for multiple battery states, or "zones." Each zone panel 204 may be accessed through a tab UI control 206A-206C containing the name of the zone, such as the "Green Zone" tab UI control 206A, the "Amber Zone" tab UI control 206B, and the "Red Zone" tab UI control 206C further shown in FIG. 2.

Each of the zone panels 204 contains a list of action selection UI controls 210 allowing the user to specify how the CDP process should operate when the battery is in the corresponding state. For example, as shown in FIG. 2, the list of action selection UI controls 210 may contain a "Do Nothing" action selection UI control 210A allowing the user to specify that the CDP module 114 should perform no CDP processing when the battery is in the corresponding state. The list of action selection UI controls 210 may contain a "Track Changes" action selection UI control 210B allowing the user to specify that the CDP module 114 should make a record all monitored data files 108 that have changed, but no backup-ups of the changed files will be taken. When, at a later time, external power is restored to the user computer 102, the CDP module 114 may perform a backup operation to ensure that that the latest versions of all modified data files 108 are backed-up to the appropriate backup location(s) 120, as will be described below in regard to FIG. 3.

The list of action selection UI controls 210 may further contain a "Restricted Protection" action selection UI control 210C allowing the user to specify that the CDP module 114 should perform the CDP process under certain, specified restrictions. In one embodiment, when the "Restricted Protection" action selection UI control 210C is selected, a list of restriction selection UI controls 212 are enabled that allow the user to specify the restrictions under which the CDP process should operate when the battery is in the corresponding state. The user may select some, all, or none of the restriction selection UI controls 212 in the list. For example, as further shown in FIG. 2, the list of restriction selection UI controls 212 may contain a "Do Not De-Dupe" restriction selection UI control 212A allowing the user to specify that the CDP module 114 should not perform de-duplication processing when backing-up new versions of modified data files 108.

The list of restriction selection UI controls 212 may also contain a "Do Not Compress" restriction selection UI control 212B allowing the user to specify that the CDP module 114 should not perform compression when backing-up new versions of modified data files 108. The list of restriction selection UI controls 212 may contain a "Do Not Send to Remote" restriction selection UI control 212C allowing the user to specify that the CDP module 114 should not send new versions of modified data files 108 to remote backup locations, such as the remote storage 120C, over the network 124 as described above in regard to FIG. 1. Instead, the CDP module 114 may retain the backed-up versions of the modified data files 108 on a local storage device 120A, and send the backed-up versions to the remote storage 120C once external power has been restored to the user computer 102.

Similarly, the list of restriction selection UI controls 212 may also contain a "Do Not Send To Cloud" restriction selection UI control 212D and/or a "Do Not Send to Removable Drive" restriction selection UI control 212E allowing the user to specify that the CDP module 114 should not send new versions of modified data files 108 to cloud-based storage services or external/removable storage devices 120B, respectively, when the battery is in the corresponding state. Instead, the CDP module 114 may retain the backed-up versions of the modified data files 108 on a local storage device 120A, and send the backed-up versions to the remote storage 120C once external power has been restored to the user computer 102, as described above. It will be appreciated that the list of restriction selection UI controls 212 may contain other restriction selection UI controls beyond those shown in FIG. 2 and described above that allow the users or administrators of the user computer 102 to specify other restrictions under which the CDP process should operate when the battery is in the corresponding state. It is intended that this application include all such restriction selection UI controls 212 and corresponding restrictions for the CDP module 114.

The user interface 200 may further contain a multi-slider UI control 214 that allows the user to define the battery state or battery level thresholds that corresponds to the configuration settings made on the zone panels 204 described above. For example, the multi-slider UI control 214 shown in FIG. 2 contains two sliders 216A, 216B that may be utilized to define three different threshold levels of battery charge, corresponding to the green zone, amber zone, and the red zone described above. The battery state is in the green zone when the remaining battery charge is between 100% and the threshold level set by the first slider 216A (90% as shown in FIG. 2). The battery state is in the amber zone when the remaining battery charge is between the threshold level set by the first slider 216A and the threshold level set by the second slider 216B (40% as shown in FIG. 2). The battery state is in the red zone when the remaining battery charge is between the threshold level set by the second slider 216B and completely exhausted (0%).

Other UI controls and components may be imagined by those skilled in the art for selection of the battery state corresponding to the various zones, including, but not limited to, separate pull-down UI controls or spin UI controls that allow upper and lower threshold levels of battery charge to be set by the user for each zone. It is intended that this application include all such UI controls and components. It will be further appreciated that more or fewer zones corresponding to battery states may be defined than the three zones described herein, and that the user interface 200 may contain the appropriate number of zone panels 204, tab UI controls 206, and sliders 216 along the multi-slider UI control 214 corresponding to each defined zone.

According to one embodiment, the user interface 200 enforces equally or more restrictive limitations on the CDP process be specified for the configuration settings for zones corresponding to more critical battery states. For example, the user interface 200 may force the user to select equal or more restrictive configuration settings for the red zone shown in FIG. 2 than the configuration settings set for the amber zone. If the "Track Changes" action selection UI control 210B is selected for the amber zone, then the user may only select the "Track Changes" action selection UI control 210B or the "Do Nothing" action selection UI control 210A for the configuration settings for the red zone. Further, if the "Restricted Protection" action selection UI control 210C is selected for the green zone, then every restriction selection UI control 212 selected for that zone must also be selected for the amber zone and the red zone.

In another embodiment, the user interface 200 includes a CPU utilization spin UI control 218. The CPU utilization spin UI control 218 allows the user to specify a CPU utilization threshold that must be exceeded before the CDP module 114 will enter the power-save mode of operation. Even if the user computer 102 is receiving power from a battery or UPS, the CDP module will continue to operate in a normal mode of operation until the CPU utilization exceeds the value selected in the CPU utilization spin UI control 218. Upon the CPU utilization exceeding the selected value, the CDP module 114 enters the power-save mode of operation. Once in the power-save mode, the CDP module 114 will continue to operate in the power-save mode until external power is restored to the user computer 102, even if the CPU utilization subsequently drops below the set threshold.

The user interface 200 may further contain a current CDP mode indicator 220 that shows the current mode of operation and/or zone for the CDP process. This may be based on whether the user computer 102 is currently receiving power from an external power supply or is operating on a battery or UPS, as well as the current state of the battery. It will be appreciated that the current CDP mode indicator 220 and other UI controls in the user interface 200 corresponding to the various defined zones may be color-coded to correspond to that zone. For example, the current CDP mode indicator 220 may be colored green when the battery state is in the green zone, as defined by the multi-slider UI control 214 described above.

According to a further embodiment, the user interface also includes a force backup trigger UI control 222. The force backup trigger UI control 222 may allow the user to cause the CDP module 114 to return to the normal mode of operation regardless of the current state of the battery, and to force the CDP module to copy new versions of any modified data files 108 pending a backup to the one or more backup locations 120, according to the CDP configuration settings 118 described above in regard to FIG. 1. This may be useful when the user has finished their primary tasks on the user computer 102 while the CDP module 114 is operating in power-save mode and the computer is running low on battery charge, and the user wants to have a backup of all data files 108 made before the battery power is completely exhausted. In one embodiment, once the force backup trigger UI control 222 has been selected, the CDP module 114 will remain in the normal mode of operation regardless of subsequent changes in the battery state.

Figure 3:
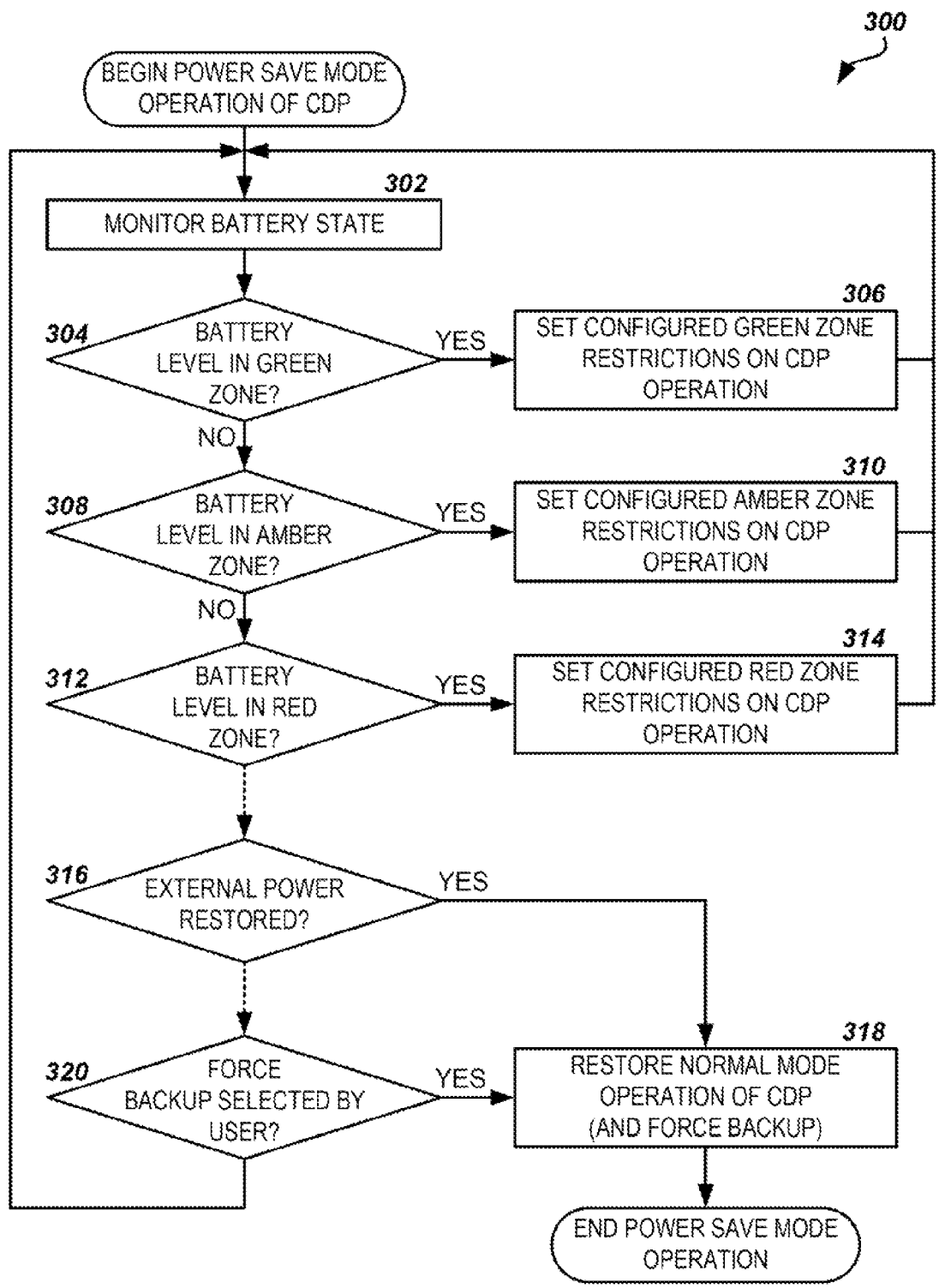
FIG. 3 is a logical flow diagram illustrating one method for providing a power-save mode of operation for a continuous data protection process, according to embodiments presented herein.

Turning now to FIG. 3, additional details will be provided regarding the embodiments presented herein for providing a power-save mode of operation for a continuous data protection process. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 shows one routine 300 for providing a power-save mode of operation for the CDP process, according to one embodiment. The routine 300 may be implemented by the CDP module 114 on the user computer 102, or the routine may performed by another module or a combination of modules executing on the user computer 102 and remote storage systems 122. In one embodiment, the routine 300 may be executed by the CDP module 114 upon detecting that the user computer 102 is receiving power from a battery or UPS. In another embodiment, the routine 300 may be initiated when the user computer 102 is operating on battery power and the CDP module 114 detects that the CPU utilization level of the computer has exceeded the threshold specified in the CPU utilization spin UI control 218 set by the user or administrator of the computer, as described above in regard to FIG. 2.

The routine 300 begins with operation 302, where the CDP module 114 monitors the state of the battery to ascertain the remaining battery charge. The CDP module 114 may be provided the current state of the battery through an API provided by the operating system 106 on the user computer 102, for example. From operation 302, the routine 300 proceeds to operation 304, where the CDP module 114 determines whether the remaining battery charge is within the threshold levels set for the green zone as defined by the multi-slider UI control 214 described above in regard to FIG. 2.

If the battery charge is in the green zone, then the routine 300 proceeds from operation 304 to operation 306, where the CDP module 114 adjusts the operation mode of the CDP process based on the action selection UI controls 210 and the restriction selection UI controls 212 specified for the green zone by the users or administrators of the user computer 102 through the user interface 200 described above. From operation 306, the routine 300 returns to operation 302, where the CDP module 114 continues to monitor the state of the battery and restrict the CDP process accordingly. If the battery charge is not in the green zone, the routine 300 proceeds from operation 304 to operation 308, where the CDP module 114 determines whether the remaining battery charge is within the threshold levels set for the amber zone as defined by the multi-slider UI control 214.

If the battery charge is in the amber zone, then the routine 300 proceeds from operation 308 to operation 310, where the CDP module 114 adjusts the operation mode of the CDP process based on the action selection UI controls 210 and the restriction selection UI controls 212 specified for the amber zone. From operation 310, the routine 300 returns to operation 302, where the CDP module 114 continues to monitor the state of the battery and restrict the CDP process accordingly. If, at operation 308, the battery charge is not in the amber zone, the routine 300 proceeds to operation 312, where the CDP module 114 determines whether the remaining battery charge is within the threshold levels set for the red zone as defined by the multi-slider UI control 214.

If the battery charge is in the red zone, then the routine 300 proceeds from operation 312 to operation 314, where the CDP module 114 adjusts the operation mode of the CDP process based on the action selection UI controls 210 and the restriction selection UI controls 212 specified for the red zone. From operation 314, the routine 300 returns to operation 302, where the CDP module 114 continues to monitor the state of the battery and restrict the CDP process accordingly.

As shown at operation 316, if at any time during the power save mode of operation the CDP module 114 determines that external power has been restored to the user computer 102, then the routine 300 proceeds to operation 318, where the CDP module 114 restores the normal operation settings for the CDP process based on the CDP configuration settings 118 specified by the user. According to one embodiment, when power is restored to the computer, the CDP module 114 also copies new versions of any modified data files 108 pending a backup to the one or more backup locations 120, according to the CDP configuration settings 118. This may serve to restore the system to a fully backed-up state and re-establish the normal operation mode of the CDP process. From operation 318, the routine 300 ends with the CDP process returned to the normal mode of operation.

Similarly, as shown at operation 320, if at any time during the power save mode of operation the CDP module 114 determines that the force backup trigger UI control 222 has been selected by the user, as described above in regard to FIG. 2, then the routine 300 proceeds to operation 318, where the CDP module 114 restores the normal operation settings for the CDP process and forces a backup of all modified data files 108 pending a backup, as described above. From operation 318, the routine 300 ends with the CDP process returned to the normal mode of operation.

Figure 4:
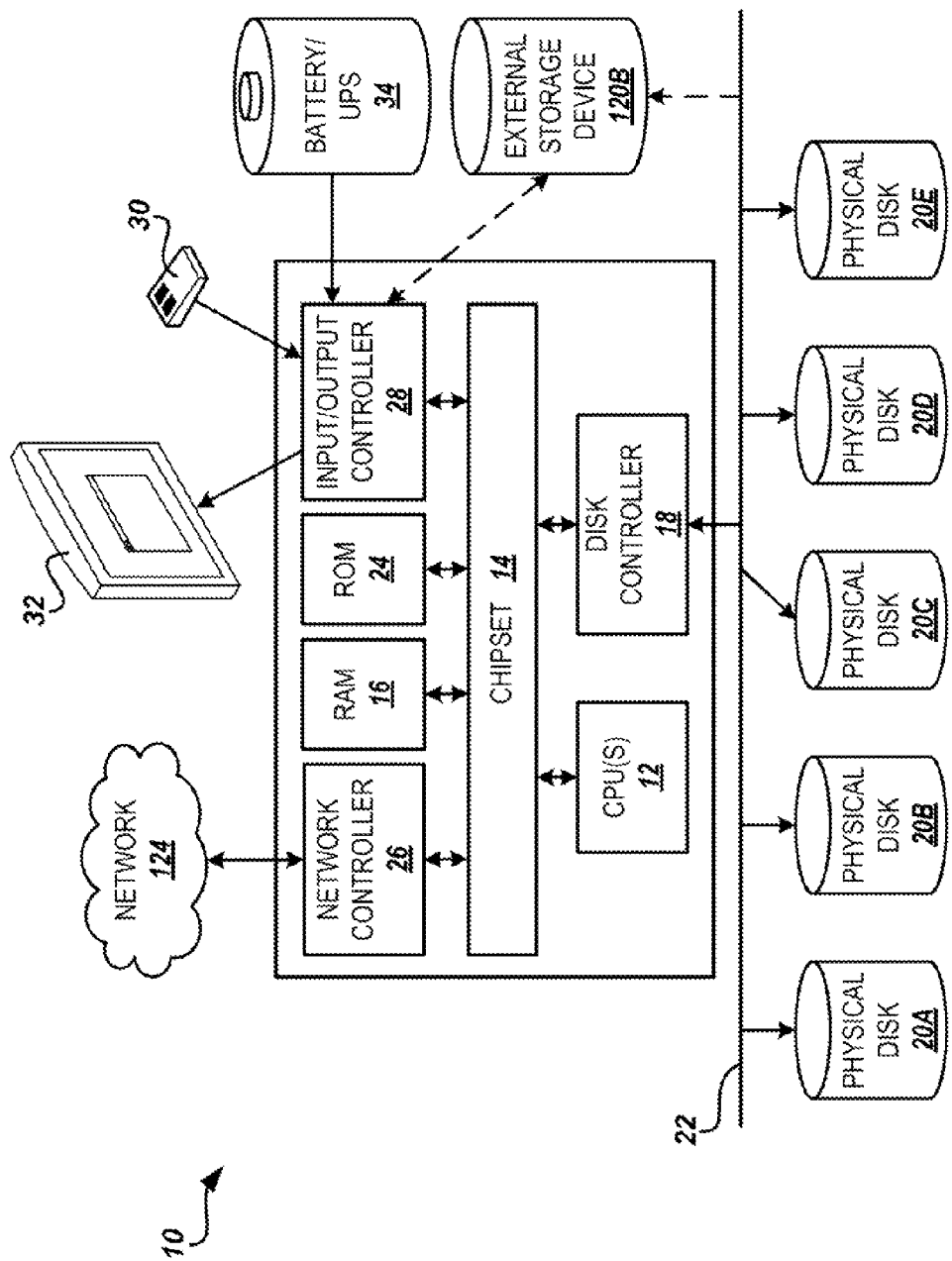
FIG. 4 is a computer architecture diagram illustrating a computer hardware architecture for a computing system capable of implementing aspects of the embodiments presented herein.

FIG. 4 and the following discussion are intended to provide a brief, general description of a suitable computing environment in which the embodiments described herein may be implemented. Those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 4 shows an illustrative computer system 10 for the user computer 102 or other computer systems described herein. In one illustrative embodiment, one or more central processing units ("CPUs") 12 operate in conjunction with a chipset 14. The CPUs 12 are standard programmable processors that perform arithmetic and logical operations necessary for the operation of the computer system 10.

The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 14 provides an interface between the CPUs 12 and the remainder of the computer system 10. The chipset 14 also provides an interface to a random access memory ("RAM") 16 used as the main memory in the computer system 10. The chipset 14 also includes functionality for providing network connectivity through a network controller 26, such as a gigabit Ethernet adapter. The network controller 26 is capable of connecting the computer system 10 to remote storage systems 122 or other computing devices over the network 124, as described above in regard to FIG. 1. The network 124 may be an Ethernet or Gigabyte Ethernet LAN, a fiber ring, a fiber star, wireless, optical, satellite, a WAN, a MAN, the Internet, or any other network technology, topology, protocol, or combination thereof. The network controller 26 may also connect the computer system 10 to other types of networks and remote computing systems.

The computer system 10 may be further connected to a number of mass storage devices, such as physical disks 20A-20E shown in FIG. 5. The disks 20A-20E may provide the data storage capacity required for the computer system 10 to store data files 108 the storage volume 110 and/or the local storage device 120A, described above in regard to FIG. 1. A disk controller 18 allows the computer system 10 to communicate with the disks 20A-20E connected to the storage node. According to embodiments, the disks 20A-20E may be connected to the computer system 10 through a bus 22 that allows the disk controller 18 to communicate with the disk drives. The disk controller 18 may interface with the disks 20A-20E through a serial advanced technology attachment ("SATA") interface, a small computer system interface ("SCSI"), a fiber channel ("FC") interface, a serial attached SCSI interface, or other standard interface for physically connecting and transferring data between computers and storage devices. According to one embodiment, the disk controller 18 may also interface with an external/removable storage device 120B connected to the bus 22 through a detachable interface, such as an eSATA or serial attached SCSI interface, as described above in regard to FIG. 1.

The computer system 10 may store data on the disks 20A-20E by transforming the physical state of the disk to reflect the information being stored. The specific transformation of physical state may depend on various factors, in different implementations of this description. Examples of such factors may include, but are not limited to, the technology used to implement the storage devices, whether the storage devices are characterized as primary or secondary storage, and the like. For example, the computer system 10 may store data to the disks 20A-20E by issuing instructions to the disk controller 18 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 10 may further read information from the physical disks 20A-20E by detecting the physical states or characteristics of one or more particular locations within the devices.

In addition to the disks 20A-20E described above, the computer system 10 may have access to other computer-readable storage media to store and retrieve information, such as program modules, data structures, or other data. It should be appreciated by those skilled in the art that computer-readable storage media includes volatile and non-volatile, removable and non-removable media implemented in any method or technology for the non-transitory storage of data and computer-executable instructions. Computer-readable storage media includes RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer system 10.

For example, the computer-readable storage media may store the operating system 106 utilized to control the operation of the computer system 10. According to one embodiment, the operating system 106 comprises the WINDOWS® operating system from MICROSOFT Corporation of Redmond, Wash. According to further embodiments, the operating system may comprise the LINUX, UNIX, or SOLARIS operating systems. It should be appreciated that other operating systems may also be utilized. The computer-readable storage media may store other system or application programs, such as the local applications 104 or the CDP module 114 described above, as well as other data files utilized by the computer system 10.

In one embodiment, the computer-readable storage medium may be encoded with computer-executable instructions that, when loaded into the computer system 10, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer system 10 by specifying how the CPUs 12 transitions between states, as described above. According to one embodiment, the computer system 10 may have access to computer-readable storage media storing computer-executable instructions that, when executed by the computer system, perform the routine 300 for providing a power-save mode of operation for a continuous data protection process, described above in regard to FIG. 3.

The chipset 14 may also provide an interface to a computer-readable storage medium such as a ROM 24 or NVRAM for storing a firmware that includes program code containing the basic routines that help to start up the computer system 10 and to transfer information between elements within the computer system 10. The ROM 24 or NVRAM may also store other software components necessary for the operation of the computer system 10 in accordance with the embodiments described herein.

The chipset 14 may also include or provide an interface to an input/output controller 28. The input/output controller 28 may receive and process input from a number of input devices, including, a mouse 30, a keyboard, a touchpad, a touch screen, an electronic stylus, or other type of input device. Similarly, the input/output controller 28 may provide output to a display device 32, such as a computer monitor, a flat-panel display, a digital projector, a printer, a plotter, or other type of output device.

The input/output controller 28 may further provide an interface with a UPS or battery system 34 supplying power to the computer 10 that may be utilized by the CDP module 114 to ascertain the current battery state. According to one embodiment, the input/output controller 28 also interfaces the computer system 10 with the external/removable storage device 120B through a detachable interface, such as a USB or FIREWIRE interface, as described above in regard to FIG. 1. It will be appreciated that the computer system 10 may not include all of the components shown in FIG. 4, may include other components that are not explicitly shown in FIG. 4, or may utilize an architecture completely different than that shown in FIG. 4.

Based on the foregoing, it should be appreciated that technologies for providing a power-save mode of operation for a continuous data protection process are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method of providing a power-save mode of operation in a continuous data protection ("CDP") process, the method comprising executing instructions on a computer to perform the operations of:
    detecting that the computer is receiving power from a battery;
    upon detecting that the computer is receiving power from a battery, entering a power-save mode of operation of the CDP process;
    monitoring the state of the battery;
    determining whether a remaining battery charge falls within threshold levels defined for a first zone of a plurality of zones;
    upon determining that the remaining battery charge is within the threshold levels defined for the first zone, configuring the operation of the CDP process based on one or more configuration settings corresponding to the first zone;
    detecting that a forced backup operation has been triggered by a user of the computer; and
    upon detecting that the forced backup operation has been triggered, copying new versions of all monitored data files pending a backup to one or more backup locations and returning to a normal mode of operation of the CDP process.

2. The computer-implemented method of claim 1, wherein the state of the battery is repeatedly monitored, and the operation of the CDP process is reconfigured each time the remaining battery charge falls within the threshold levels defined for a next zone from the plurality of zones.

3. The computer-implemented method of claim 1, further comprising:
    detecting that external power has been restored to the computer; and
    upon detecting that external power has been restored to the computer, returning to a normal mode of operation of the CDP process.

4. The computer-implemented method of claim 1, wherein the power-save mode of operation of the CDP process is entered upon detecting that the computer is receiving power from a battery and that a CPU utilization value of the computer has exceeded a defined threshold.

5. The computer-implemented method of claim 1, wherein the one or more configuration settings corresponding to the first zone comprises a configuration setting specifying that no CDP processing should be performed.

6. The computer-implemented method of claim 1, wherein the one or more configuration settings corresponding to the first zone comprises a configuration setting specifying that changes made to monitored data files should be tracked but that no new versions should be copied to backup locations.

7. The computer-implemented method of claim 1, wherein the one or more configuration settings corresponding to the first zone comprises a configuration setting specifying that the CDP process should be performed in a restricted mode.

8. The computer-implemented method of claim 1, wherein the one or more configuration settings corresponding to each of the plurality of zones are equally or more restrictive than the one or more configuration settings corresponding to the other of the plurality of zones having higher threshold levels defined for the remaining battery charge.

9. The computer-implemented method of claim 7, wherein the one or more configuration settings corresponding to the first zone comprises a configuration setting specifying that the restricted mode of the CDP process should not include de-duplication of data.

10. The computer-implemented method of claim 7, wherein the one or more configuration settings corresponding to the first zone comprises a configuration setting specifying that the restricted mode of the CDP process should not include compression of data.

11. The computer-implemented method of claim 7, wherein the one or more configuration settings corresponding to the first zone comprises a configuration setting specifying that the restricted mode of the CDP process should not include copying new versions of monitored data files to one or more of an external/removable storage device, a remote storage, or a cloud-based storage service.

12. A computer-readable storage medium having computer-executable instructions stored thereon that, when executed by a computer, cause the computer to:
  detect that the computer is receiving power from a battery;
  upon detecting that the computer is receiving power from the battery, enter a power-save mode of operation of a continuous data protection ("CDP") process;
  monitor the state of the battery;
  determine whether a remaining battery charge falls within threshold levels defined for a first zone of a plurality of zones;
  upon determining that the remaining battery charge is within the threshold levels defined for the first zone, configure the operation of the CDP process based on one or more configuration settings corresponding to the first zone;
  detect that external power has been restored to the computer;
  upon detecting that external power has been restored to the computer, return to a normal mode of operation of the CDP process;
  detect that a forced backup operation has been triggered by a user of the computer; and
  upon detecting that the forced backup operation has been triggered, copy new versions of all monitored data files pending a backup to one or more backup locations and returning to a normal mode of operation of the CDP process.

13. The computer-readable storage medium of claim 12, wherein the state of the battery is repeatedly monitored, and the operation of the CDP process is reconfigured each time the remaining battery charge falls within the threshold levels defined for a next zone from the plurality of zones.

14. A system for providing a power-save mode of operation in a continuous data protection ("CDP") process of a computer, the system comprising:
  a user interface configured to allow a user of the computer to specify one or more configuration settings corresponding to each of a plurality of zones and to define threshold levels for a remaining battery charge or each of the plurality of zones; and
  a CDP module executing on the computer and configured to
    detect that the computer is receiving power from the battery,
    upon detecting that the computer is receiving power from the battery, enter a power-save mode of operation of the CDP process,
    monitor the state of the battery,
    determine whether the remaining battery charge falls within the threshold levels defined for one of the plurality of zones,
    upon determining that the remaining battery charge falls within the threshold levels defined for the one of the plurality of zones, configure the operation of the CDP process based on the one or more configuration settings corresponding to the one of the plurality of zones,
    detect that external power has been restored to the computer,
    upon detecting that external power has been restored to the computer, return to a normal mode of operation of the CDP process,
    detect that a forced backup operation has been triggered by a user of the computer, and
    upon detecting that the forced backup operation has been triggered, copy new versions of all monitored data files pending a backup to one or more backup locations and returning to a normal mode of operation of the CDP process.

15. The system of claim 14, wherein the user interface is configured to allow the user to specify a configuration setting corresponding to a zone specifying that no CDP processing should be performed.

16. The system of claim 14, wherein the user interface is configured to allow the user to specify a configuration setting corresponding to a zone specifying that changes made to monitored data files should be tracked but that no new versions should be copied to backup locations.

17. The system of claim 14, wherein the user interface is configured to allow the user to specify a configuration setting corresponding to a zone specifying that the CDP process should be performed in a restricted mode, and wherein the user interface is further configured to allow the user to specify one or more restrictions to be placed on the CDP process while operating in the restricted mode.

18. The system of claim 14, wherein the user interface is configured to enforce that the one or more configuration settings corresponding to each of the plurality of zones are equally or more restrictive than the one or more configuration settings corresponding to the other of the plurality of zones having higher threshold levels defined for the remaining battery charge.

* * * * *